United States Patent [19]
Insolio

[11] 4,005,808
[45] Feb. 1, 1977

[54] PLASTIC CUTTING METHOD

[75] Inventor: Thomas A. Insolio, Bristol, Conn.

[73] Assignee: The Fletcher-Terry Company, Farmington, Conn.

[22] Filed: May 2, 1975

[21] Appl. No.: 573,813

Related U.S. Application Data

[63] Continuation-in-part of Ser. No. 437,982, Jan. 30, 1974, abandoned.

[52] U.S. Cl. .................................. 225/2; 225/96.5
[51] Int. Cl.² .......................................... B26F 3/02
[58] Field of Search ................... 225/2, 94, 96, 96.5

[56] References Cited

UNITED STATES PATENTS

| 3,567,086 | 3/1971 | Wark | 225/2 |
|---|---|---|---|
| 3,830,123 | 8/1974 | Wilgus | 83/171 |

*Primary Examiner*—Leon Gilden
*Attorney, Agent, or Firm*—McCormick, Paulding & Huber

[57] ABSTRACT

Plastic sheet material is scored and broken by a three-step process, either in an automated version or by means of a manual approach. The automated version includes a carriage with a first station having a heated scoring tool, and a backup, or anvil roller, against which the tool can act as a carriage traverses the sheet. A second station in the carriage includes two laterally spaced bending rollers, and another anvil roller which cooperates with these bending rollers to deflect the sheet through a critical bend angle (approximately 4°, but less than 6°) to develop a fissure at the score line. A third station in the carriage includes an anvil roller and two more bending rollers for actually breaking the sheet. The manual version utilizes a longitudinally extending bead beneath the score line and a cross slide mounted on guide rails and adapted for movement above the bead, the cross slide carries a scoring tool which includes a handle portion also useable as a sheet cracking device. In the manual approach the cross slide and scoring tool is used first to score the sheet. The cross slide is then used with the handle of the scoring tool inverted to apply symmetrical cracking forces to bend the sheet to a critical bend angle (approximately 4°, but less than 6°) and thereby develop a fissure at the score line. The third step is accomplished manually by sliding the scored sheet, with the associated fissure, toward a free edge of the table to permit breaking the sheet in a conventional step used presently with glass.

6 Claims, 12 Drawing Figures

PLASTIC CUTTING METHOD

CROSS REFERENCE TO RELATED APPLICATION

This application is a continuation-in-part of my co-pending application bearing the same title filed Jan. 30, 1974, under Ser. No. 437,982, and now abandoned.

SUMMARY OF THE INVENTION

This invention relates generally to a method and apparatus for scoring and breaking plastic sheet material, and deals more particularly with a three-step process for cutting fracture-sensitive plastic sheet material such as acrylic sheets.

The conventional two step process by which glass sheets are scored and broken is well known, but has not proven entirely satisfactory as a commercially practical process in the fabrication of plastic sheet materials to a predetermined size. Plastic materials generally lack the rigidity and crystaline structure which make it feasible to "cut" glass sheets by the conventional "score and break" method. After a glass sheet is scored one can run the break along the line of score by simply bending one end of the sheet about the score line in a well known manner. However, if one uses this approach with plastic material, the relatively less rigid plastic will bend on a line which veers off from the direction of the score line. If further bending is applied to the end of the sheet as in the well known method of breaking off a sheet of glass, the break line in the plastic bears off away from the score line following an arcuate cracking path. In order to cut relatively small sheets of plastic material, it has been found that the crack can be made to follow the score line if the plastic sheet is bent equally along its full width. Conventional fabrication of plastic sheets of larger size and thickness has been restricted to the more obvious and conventional process of sawing or the like.

The general aim of the present invention therefore, is to provide a novel variation of the two step "score and break" method used in breaking glass sheets to provide a third step involving the inducing of a small fissure at the score line and at a particular stage of the overall process so that the plastic sheet can be subsequently bent, and the break run along the score line instead of along an uncontrolled line bearing away from the score line.

DETAILED DESCRIPTION OF THE PREFERRED EMBODIMENT SHOWN IN FIGS. 1–5B INCLUSIVELY

Figure 1:
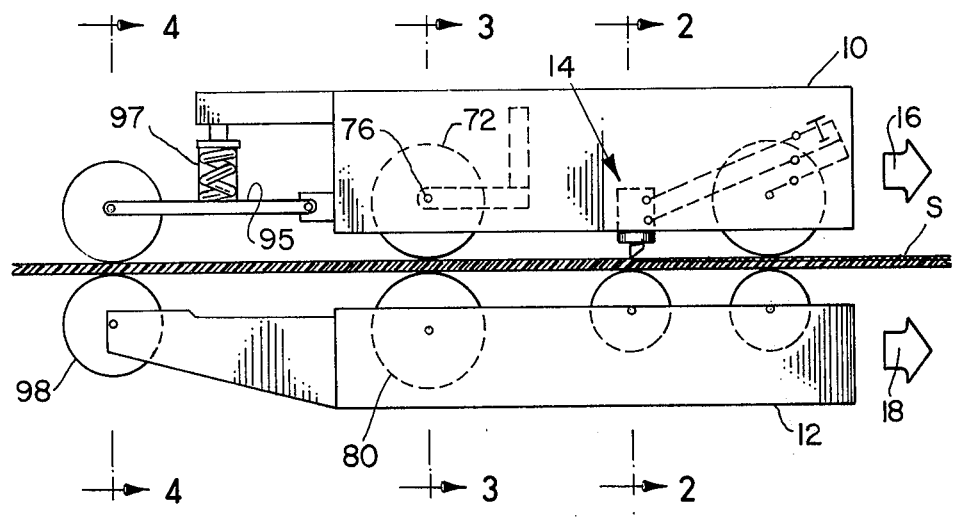
FIG. 1 is an elevational view through a carriage equipped with apparatus according to the present invention, the scoring, bending and breaking stations being depicted in somewhat schematic fashion.

Turning now to the more detailed description of the apparatus for scoring, bending and breaking plastic sheet in accordance with the present invention, FIG. 1 shows, in somewhat schematic fashion, a carriage structure which includes an upper carriage 10, together with a lower carriage 12, in which carriages sets of rollers, to be described, are rotatably mounted.

Although not shown in FIG. 1 the upper and lower carriages 10 and 12 respectively, are adjustably mounted, one with respect to another, to permit varying the vertical space between their associated rollers. It is also an important feature of the carriage structure shown in FIG. 1 that although both the upper and the lower carriages, 10 and 12 respectively, are adapted to be moved so that the carriage structure traverses the plastic sheet S to be scored and broken the carriage might be made stationary and means provided to move the sheet S. That is, the carriage structure might be fixed and the plastic sheet S moved between the upper and lower carriage components, 10 and 12 respectively, without departing from the scope of the present invention. However, in the description to follow and in the claims forming a part of this application, the invention will be described in terms of the sheet S being clamped or otherwise held to a sub-adjacent table structure (not shown in FIG. 1) and the upper and lower carriages, 10 and 12 respectively, will be described as being movable so that the cutting tool 14 and its associated rollers are adapted to move in more or less fixed relationship to one another but nevertheless to move with respect to the machine frame (not shown).

Figure 5:
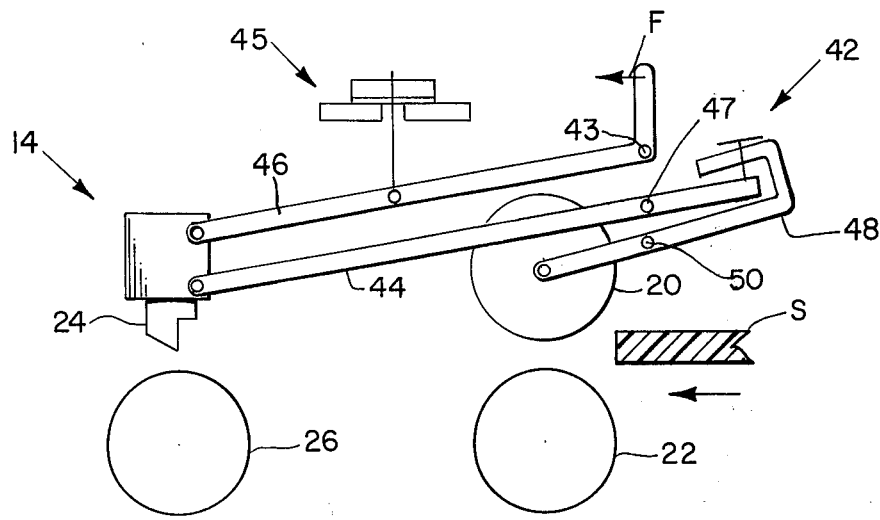
FIGS. 5, 5A and 5B show schematically the mechanism for supporting the knife, or scoring tool together with the linkage and other mechanism for controlling the height at which the tool initially contacts the plastic sheet.
Figure 5A:
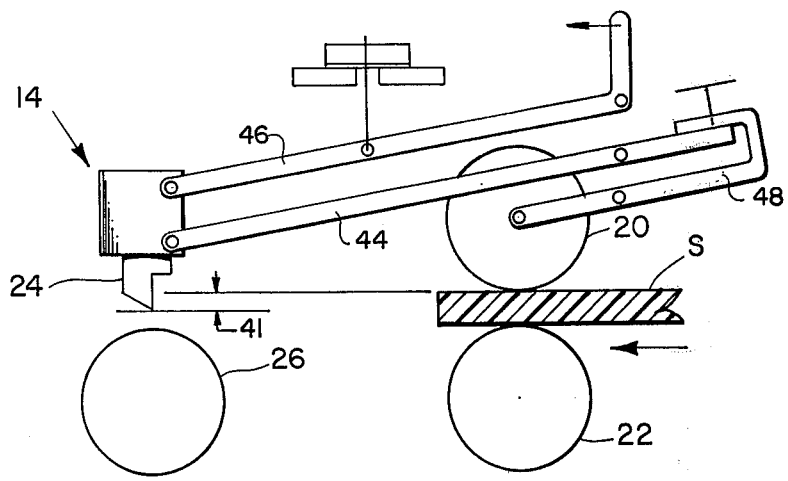
Figure 5B:
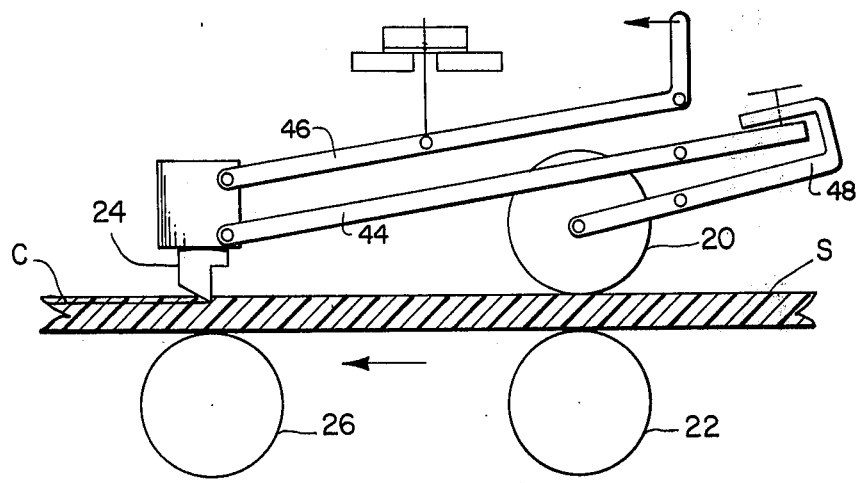

Still with reference to FIG. 1 the upper and lower carriages, 10 and 12 respectively, are adapted to move with respect to the plastic sheet S in the direction indicated for them by the arrows 16 and 18 respectively. As shown in the sequence of views depicted in FIGS. 5, 5A and 5B it will, perhaps be somewhat simplier to consider the carriage stationary and to consider the plastic sheet S as moving between the upper and lower rollers 20 and 22 respectively and thence between backup roller 26 and the cutting tool 24. The apparatus depicted schematically in these views, FIGS. 5, 5A and 5B, is substantially the same as the apparatus described in greater detail in my issued U.S. Pat. No. 3,399,586, and therefor, this apparatus need not be described in detail herein. However, for the purpose of clarity, it should perhaps be noted that the lower wheel 22 is rotatably supported in the lower carriage 12 and the upper wheel 20 comprises a jump-up wheel which is rotatably supported on a lever 48, which lever is pivotally supported in the upper carriage 10 at the pivot 50. The scoring device 1 is mounted on a parallel linkage system comprising the levers 44 and 46 together with their associated pivots 43 and 47 provided in the upper carriage 10. As indicated generally by the arrow F, biasing means to exert counterclockwise rotational force on the lever 46 and hence a downward force on the cutting head 14 with the down limit adjustment device 45, provided to limit the "down" position of the cutter 24 with respect to the upper carriage 10. A differential adjustment screw 42 is provided between the lever 48 associated with the jump-up wheel 20, and the lever 44 associated with the parallel linkage mounting for the cutting device 14, to control the differential in vertical height between the tip of the scoring tool 24 and the lower periphery of the jump-up wheel 20. This preset adjustment is indicated generally at 41 in an exaggerated fashion in FIG. 5. From the structure depicted schematically in FIGS. 5, 5A and 5B, it will be apparent that the cutting tool 24 will contact the edge of the sheet S to be scored without any tendency for bouncing and hence skipping a segment of the sheet, and that the score line in the sheet, as indicated generally at C in FIG. 5B, will be continuous and of constant configuration from the leading edge of the sheet S to the trailing edge thereof as the sheet traverses the carriage, or as the carriage traverses the sheet. With further reference to FIG. 5B, it is noted that when the cutter 24 contacts the plastic S, and scores it to the penetration shown at C, lever 44 is forced upwardly due to the resistance of the plastic to such scoring. The resulting clockwise pivoting lever 44 frees lever 48 and roller 20 no longer exerts any downward force on the plastic sheet.

Figure 2:
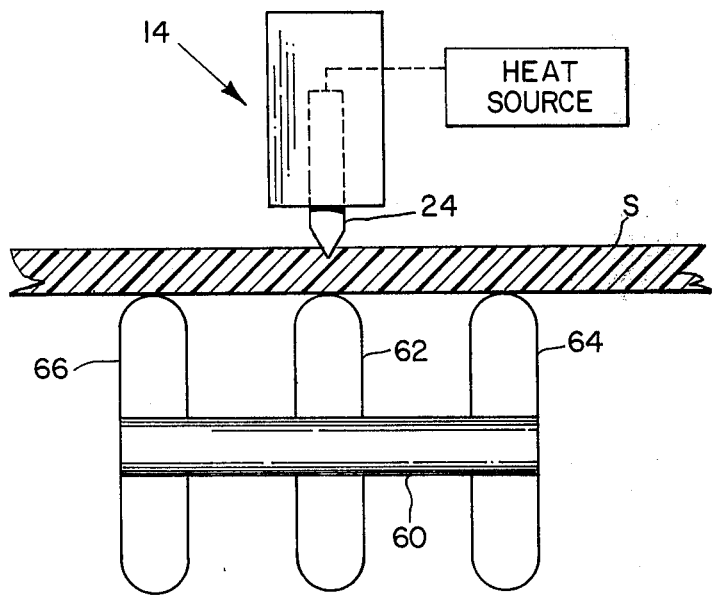
FIG. 2 is a vertical sectional view taken on the line 2—2 of FIG. 1 and shows the scoring station of the carriage.

Still with reference to the scoring of the plastic sheet by means of the knife or scoring tool 24, FIG. 2 shows the device 14 as including means for heating the scoring tip 24 and it is a feature of the present invention that this heating helps to reduce the forces required, not only to score the sheet initially, but also the forces required to develop the fissure at the second station in the carriage, and also to develop the bending forces required to actually crack or break the sheet at the third and final station in the carriage. The knife or scoring tip 24 is preferably on the order of 3/100 to 4/100 of an inch wide, and is preferably heated to a temperature in the range between 750° to 1500° Fahrenheit for best results. Preferably, the method of heating the scoring tip is to provide a resistance element therein and to pass electricity through said element in order to maintain the temperature at the desired range.

Still with reference to FIG. 2, the plastic sheet S must be maintained in a flat configuration during the scoring step of the present invention, and three rollers are arranged on a common axle 60 for properly supporting the sheet S as it is being scored. The central roller 62 comprises an anvil wheel and preferably has a convex periphery. The anvil wheel 62 is arranged vertically below the cutting tip 24 in order to properly react the downward force exerted by the cutting tip during the scoring process. The laterally spaced left and right hand backup wheels 64 and 66 may be spaced from three to five thicknesses of the plastic sheet away from the anvil wheel 62 for best results. The axle 60 associated with the lower wheels 62, 64 and 66 is rotatably supported in the lower carriage 12 and is provided vertically below the cutting tool 24. The foregoing structure defines station one in the carriage structure of FIG. 1.

The second step in carrying out the process of the present invention involves bending of the plastic sheet S about the score line C. It is important to control this bending so that the critical bend angle for the particular material involved is not exceeded. It has been found empirically that for acrylic sheets of average thickness (⅛ to ¼ inch), the critical bend angle is approximately 4°, but always less than 6°. This critical angle 70 in FIG. 3, may vary slightly depending on the thickness of and residual stresses in the plastic sheet, and the degree of controlled bending is preferably achieved by providing laterally spaced bending rollers 72 and 74 in the upper carriage 10 so that they are adapted to rotate along the upper surface of the plastic sheet S on the axis 76 which axis 76 is spaced downstream from the cutting tip 24 a sufficient distance so that the fissure developed at the core line C does not extend excessively into the plastic sheet S, nor does it extend upstream more than approximately one-half the distance X back to the cutting tip 24 at station one.

Figure 3:
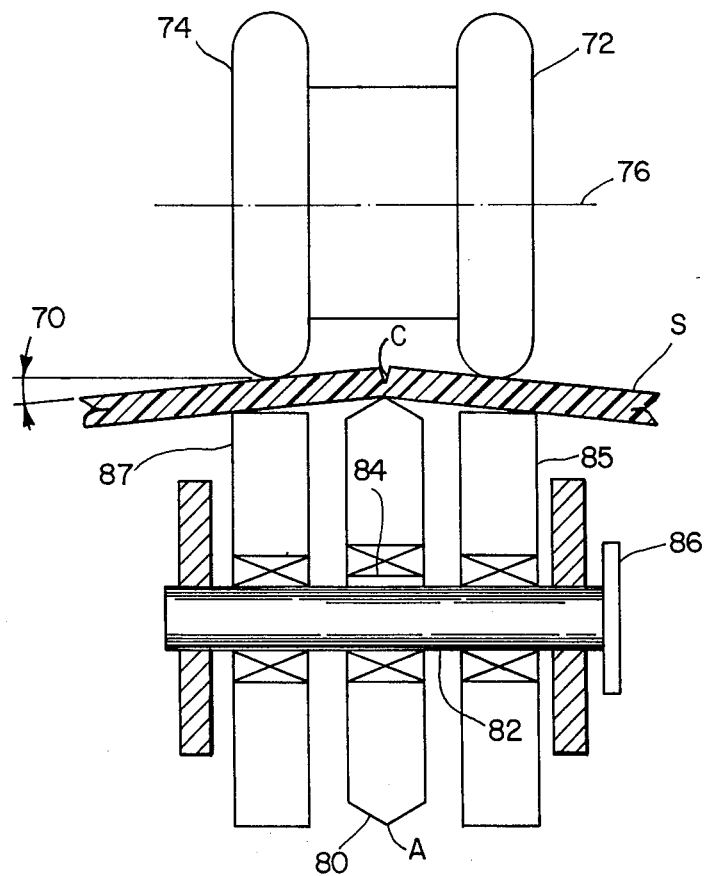
FIG. 3 is a vertical sectional view taken on the line 3—3 of FIG. 1 and shows the station in the carriage wherein the glass sheet is bent to the critical angle of approximately 4°, but less than 6° as measured from the initial horizontal plane defined by the upper surface of the plastic sheet.

Still with reference to station two, as depicted in FIG. 3, backup rollers are provided in the carriage at said second station for controlling the angle of bend 70 to limit said angle to the critical angle as referred to above. Preferably, said means include an anvil wheel 80 aligned with the anvil wheel 62 provided at the first station, and also of generally convex periphery, but preferably defining an apex A which is precisely oriented below the score line C but which is not sharp enough so as to actually score the plastic sheet S along its lower surface. The anvil wheel 80 provided at the second station in the carriage is mounted on a shaft 82 in the lower carriage 12, which shaft 82 includes an eccentric adjustment hub 84 to permit the axis of rotation of the anvil wheel 80 to be varied vertically with respect to the plane defined by the aligned periphery's of the bending sheets, 72 and 74, in order to precisely control the angle of bend 70 at this station. An outer flange 86 associated with the eccentric hub 84 permits this slight adjustment to be made.

Still with reference to FIG. 3, and to the second station in the carriage of FIG. 1, a second set of backup wheels 85 and 87 are arranged one on either side of the anvil wheel 80 and generally centered below the bending wheels, 72 and 74 respectively, to further control the bending achieved at this station and to maintain this bending at the critical bend angle for the material being handled.

Figure 4:
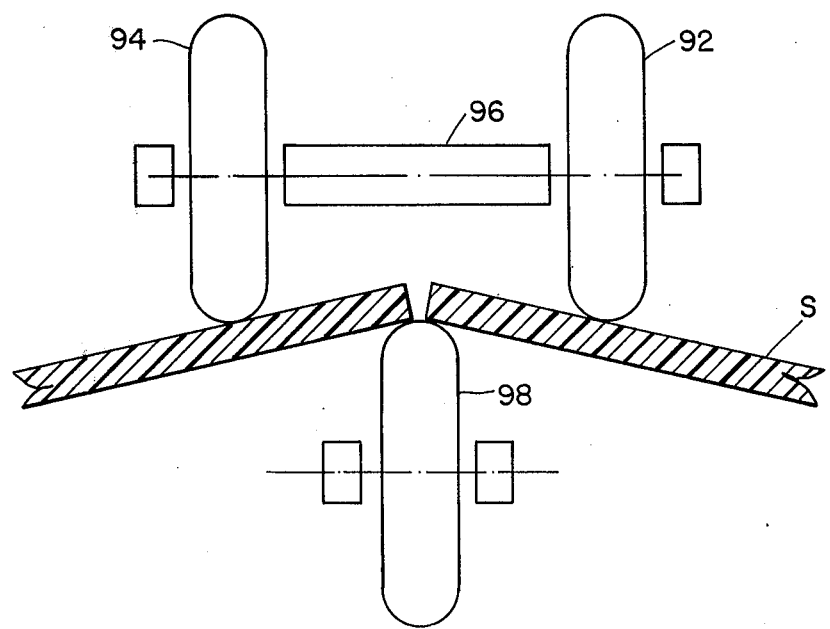
FIG. 4 is a vertical sectional view taken on the line 4—4 of the carriage shown in FIG. 1, and reveals the break out rollers used to separate the plastic sheet.

FIG. 4 shows the third station defined in the carriage of FIG. 1, at which station the plastic sheet material is separated at the score line in a process of running the break downstream of the scored and prebent plastic sheet, which separation is made possible as a result of the creation of a fissure at the second station described above. This continued bending is accomplished by providing second set of bending rollers or wheels 92 and 94 rotatably mounted on a hub structure 96 provided for this purpose in the upper carriage 10. The lateral spacing between the second set of bending rollers 92 and 94 can be varied slightly to achieve greater leverage when a plastic sheet of greater thickness is to be separated. The bending force required to separate the sheet may be achieved by mounting the upper bending rollers 92 and 94 on a lever 95 as shown in FIG. 1 and exerting the necessary force by means of biasing means 97 in the form of either a strong coil spring or in the form of a hydraulic cylinder.

Still with reference to the third station of the carriage depicted in FIG. 1, a lower anvil wheel 98 is provided in the lower carriage 12 for reacting the forces applied by the upper bending wheels 92 and 94.

DETAILED DESCRIPTION OF ALTERNATIVE EMBODIMENT DEPICTED IN FIGS. 6–10 INCLUSIVELY

Figure 6:
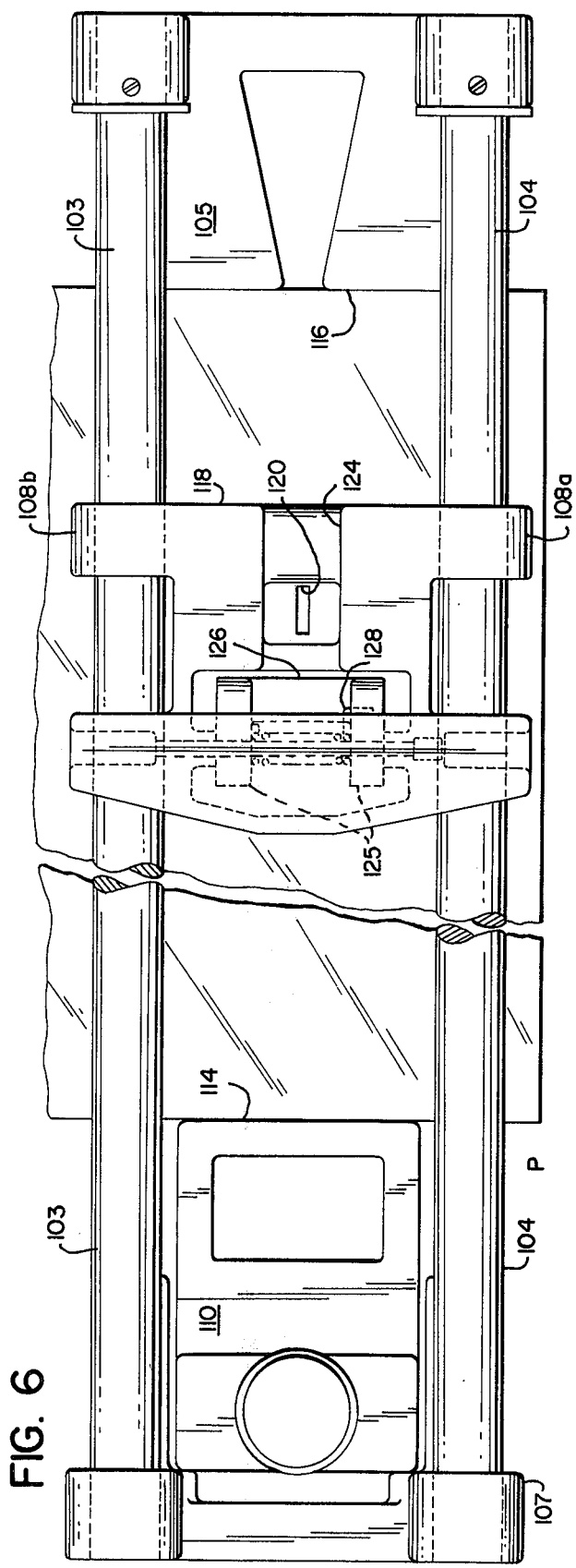
FIG. 6 is a plan view of an alternative embodiment of the present invention which embodiment is suitable for carrying out the method of the present invention with a manually operated mechanism.
Figure 7:
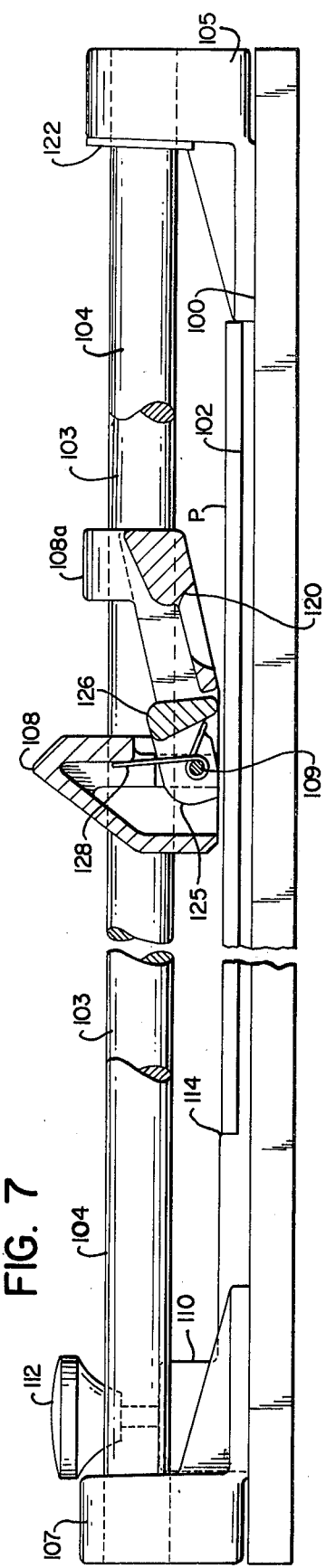
FIG. 7 is a side elevational view of the mechanism of FIG. 6 with portions broken away to provide a partial vertical sectional view of said portions.

The method described above with reference to FIGS. 1–5B inclusively can also be carried out by means of the manual mechanism to be described hereinbelow with reference to FIGS. 6–10 inclusively. The plastic sheet to be severed is placed on a generally flat surface or table 100 best shown in FIG. 8, which surface or table has a cross slide and anvil mechanism mounted integrally therein. The anvil defining portion 102 has an upper surface which comprises a laterally extending bead along the intended line of cut or separation. With particular reference to FIG. 7, the upper surface of the table 100 defines a generally flat plane upon which the plastic sheet P can be placed, and this plastic sheet P extends below a pair of parallel guide rods 103 and 104 arranged in fixed relationship to the anvil 102. These guide rods 103 and 104 are preferably long enough to accommodate plastic sheets of various lateral extent, and as shown in FIGS. 6 and 7, the right-hand ends of these guide rods 103 and 104 are mounted in a fixed bracket 105. The left-hand ends are similarly mounted in a left-hand bracket 107. A laterally adjustable stop member 110 is provided on the anvil defining member 102, and includes a clamping device 112 which permits this stop member 110 to be mounted so that its right-hand edge 114 can be placed in abutment with a longitudinally extending edge of the plastic sheet P as best shown in FIGS. 6 and 7. The plastic sheet P can be located against the left-hand edge 116 of the bracket 105 and and the right-hand edge 114 of the adjutable stop member 110 so that the sheet occupies a position depicted in broken lines in FIG. 8 suitable for a preliminary scoring step to be described.

Figure 8:
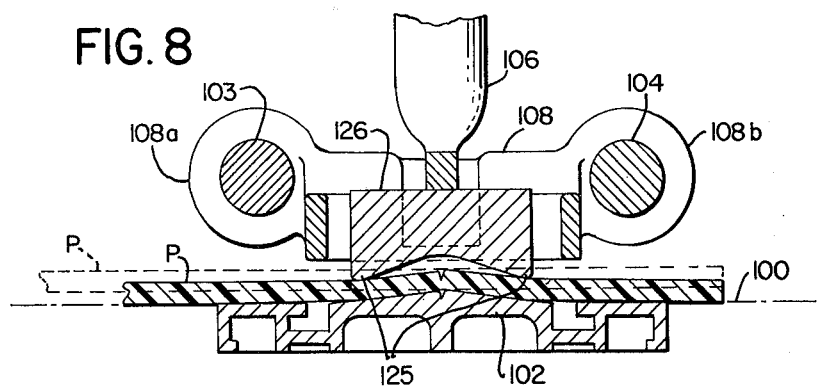
FIG. 8 is a vertical sectional view taken generally on the line 8—8 of FIG. 10.
Figure 9:
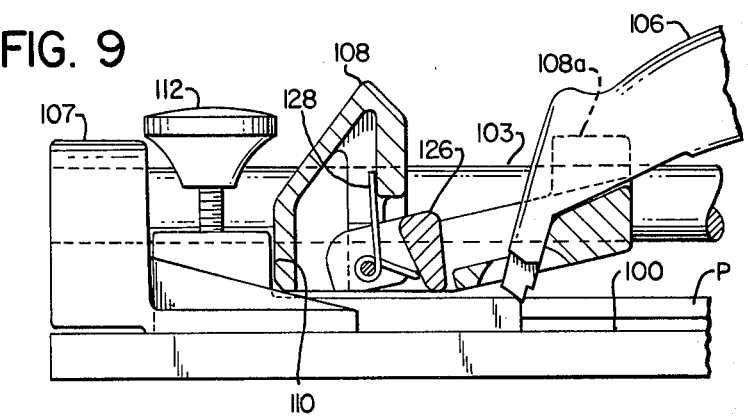
FIG. 9 is a vertical sectional view of a portion of the mechanism shown in FIG. 7 showing a scoring tool at one limit of its travel.
Figure 10:
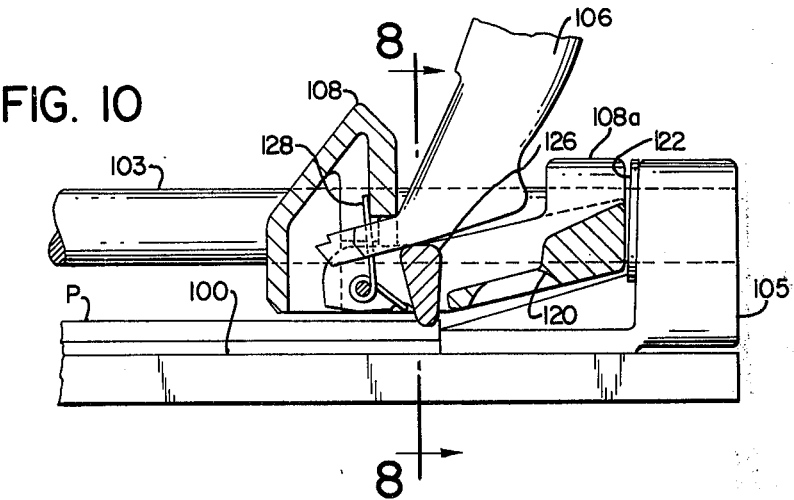
FIG. 10 is a vertical sectional view of the same portion as depicted in FIG. 9 but with a sheet bending tool at an opposite limit of its travel.

A cross slide indicated generally at 108 in FIGS. 6 and 7 is slidably mounted on the guide rods 103 and 104 as best shown in FIG. 8 by means of bosses 108a and 108b defined for this purpose on a right-hand portion of the cross slide 108 which right-hand portion is integrally connected to a left-hand handle portion. The cross slide includes a tool guide portion 118 having an opening 120 for receiving a scoring tool 106 with the result that the scoring tool 106 can be used to draw the cross slide 108 from an initial position adjacent the stop member 110, as best shown in FIG. 9, generally toward the right in FIGS. 6 and 7 until the carriage is itself stopped against the abutment surface 122 defined on the right-hand bracket 105, as best shown in FIG. 10. The score line or cut in the plastic sheet P is made to a depth dictated by the thickness of the plastic sheet, and preferably has a width of approximately 0.03 to 0.04 inches. The scoring tool 106 may be heated to approximately 1000° F for scoring acrylic sheets although other plastic material can also be handled. It is desirable to maintain the plastic material itself at or above room temperature, and the advantages of the present invention can best be realized by maintaining a temperature of the scoring tool itself in a range between 750° F and 1500° F. The cutting tip itself preferably comprises a knife blade having a width to provide the cut width mentioned above, and the scoring tool is further characterized by a shape which will permit insertion of the cutting tip in the opening 120 provided for this purpose in the guide portion 118 of the slide so that the tool itself can be drawn across the surface of the plastic sheet and the sheet thereby scored in a manner substantially as described hereinabove with reference to the previous embodiment.

It will be apparent from FIG. 9 that the depth of cut will be closely controlled by the configuration of the cavity 124 provided for this purpose in the cross slide guide 118 in conjunction with the shape of the handle portion of the tool 106. The cross slide has an upstanding portion which will permit the operator to manually assist movement of the cross slide with his left-hand even as his right-hand pulls the handle portion 106 of the scoring tool so that a constant force can be exerted on the plastic sheet P. Thus, the operator need not exert an excessive downward force on the plastic sheet during this scoring step, and although the plastic sheet may deflect slightly during the scoring step, the underlying anvil 102 is associated with the cross slide's well defined path precludes excessive penetration of the scoring tool itself.

Once the plastic sheet has been so scored, as depicted schematically in FIG. 8 by reference to the broken line, the next step in the method of the present invention involves a bending step wherein the score is deepened by virtue of creating a fissure in the upper surface of the plastic sheet to extend the depth of the score itself. This is accomplished by bending the sheet about the anvil shape to provide approximately 4°, but less than 6° angle of deflection on both sides of said anvil. This degree of critical bending is preferably accomplished as shown in FIG. 10 by inverting the cutting tool 106 thereby providing the cutting tip in an inactive position, and into an opening defined for this purpose between the upstanding portion of the cross slide 108 and an underlying member 126 mounted on a rock shaft 109. A torsion spring 128 is provided on the shaft 109 to bias this member 126 toward its inactive position shown in FIG. 9. However, when the tool 106 is inserted as shown in FIG. 10, a counterclockwise moment exerted on the handle of the tool will force the member 126 downwardly into the solid line configuration depicted in FIG. 8. Ears 125, 125 pivotally support the member 126 for pivotal movement on the shaft 109, and downwardly facing lands 127, 127 engage the upper surface of the plastic sheet at spaced points in a manner generally similar to that described above with reference to the previous embodiment. When the operator again draws the cross slide 118 across the sheet in the same direction as defined to create the score line, the member 126 will deform the plastic sheet P to the solid line position depicted in FIG. 8 and thereby create a fissure in the upper surface of the plastic sheet P at the score line previously formed in a manner generally similar to that described hereinabove with reference to the first embodiment.

The controlled bending of the plastic sheet material, to approximately 4°, but not exceeding 6°, forms a fissure which extends into the material to a depth beyond that achieved by the scoring step alone. The creation of such fissure prevents any tendency of the plastic sheet material to break on a line which departs from the desired straight score line.

The final step in this manual method is similar to the final and third step described hereinabove with reference to the previous embodiment and the plastic sheet is moved from its position over the anvil 102 and positioned generally adjacent the edge of the underlying table 100 and more particularly at one marginal edge thereof so that the sheet can be further deflected past the critical bend angle to "run" the break along the line of score in a manner similar to that used on breaking sheet material of glass. The resulting "break" line will tend to follow the score line rather than to veer off along a line other than that associated with the score line.

I claim:

1. A method for scoring and breaking plastic sheet material and comprising:
    a. placing the sheet on a generally flat surface at a first location, and providing the intended line of cut over a raised bead in said table,
    b. scoring the upper surface of the sheet opposite the bead,
    c. deflecting said sheet on both sides of the resulting score line through a critical bend angle in the range between 4° and 6° as measured from the plane defined by the initially flat upper surface of the plastic sheet,
    d. further deflecting said sheet past said critical bend angle at a second location and only after said first mentioned deflecting step, and
    e. heating said scoring tool to a temperature in the range between 750° and 1500° F prior to said scoring step.

2. The method of claim 1 wherein said further deflecting step is accomplished by bending said sheet about a table edge or the like.

3. The method of claim 1 wherein said scoring, deflecting, and further deflecting steps are accomplished at longitudinally spaced locations along said score line, said longitudinal spacing being at least as great as the lateral spacing of the force applying areas from said score line.

4. A method for scoring and breaking plastic sheet material comprising the successive steps of:
    a. placing the sheet on a generally flat surface, and providing the intended line of score over a raised bead in said table,
    b. passing a scoring tool across the upper surface of the sheet opposite the bead to provide a relatively shallow V-shaped score line,
    c. passing a sheet bending device across the upper surface of the sheet while the lower surface remains on the bead to deflect the sheet downwardly on both sides of the score line through deflection angles in the range between 4° and 6° as measured from the plane of the initially flat upper surface of the sheet, to produce a deepened fissure in the sheet,
    d. removing the sheet from its position over the bead and exerting a bending moment at least at one end of the sheet to project the fissure through the sheet, and to facilitate
    e. running the break along the deepened fissure produced by the step (d) in a manner not unlike that of breaking glass following a single scoring step.

5. The method of claim 4 wherein said step (d) is accomplished by bending said sheet about a table edge or the like beyond said 4° to 6° of step (c) above.

6. The method of claim 4 wherein said method is further characterized by heating the scoring tool prior to said scoring step.

* * * * *

UNITED STATES PATENT OFFICE
CERTIFICATE OF CORRECTION

Patent No. 4,005,808　　　　　　　　Dated February 1, 1977

Inventor(s) Thomas A. Insolio

It is certified that error appears in the above-identified patent and that said Letters Patent are hereby corrected as shown below:

Col. 3, line 6, "1" should be --14--.

Col. 5, line 41, after "105" delete second "and".

Signed and Sealed this

Third Day of May 1977

[SEAL]

Attest:

RUTH C. MASON
*Attesting Officer*

C. MARSHALL DANN
*Commissioner of Patents and Trademarks*